Figure 1:
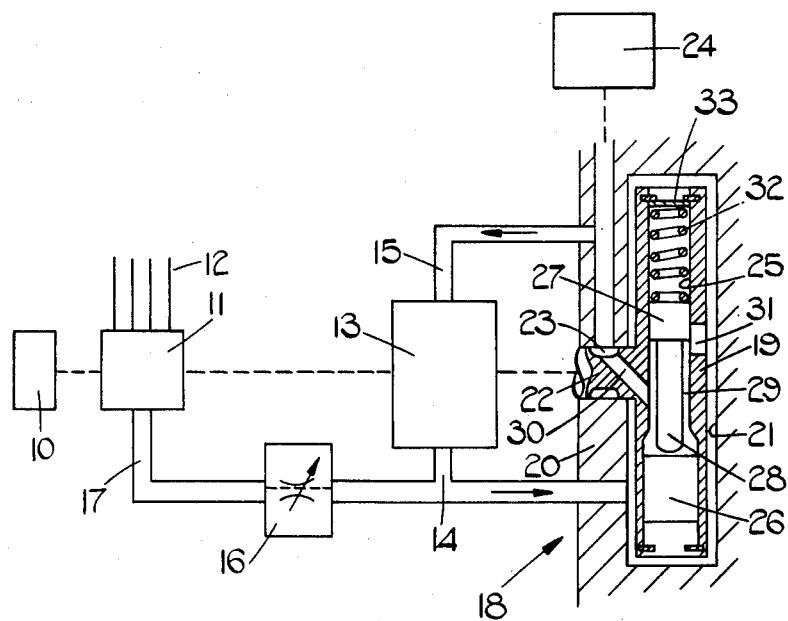

United States Patent [19]

Brotherston

[11] 4,178,137

[45] Dec. 11, 1979

[54] PRESSURE REGULATOR FOR A FLUID PUMP

[75] Inventor: Colin P. Brotherston, Banstead, England

[73] Assignee: Lucas Industries Limited, Birmingham, England

[21] Appl. No.: 863,316

[22] Filed: Dec. 22, 1977

[30] Foreign Application Priority Data

Jan. 4, 1977 [GB] United Kingdom ............... 00104/77

[51] Int. Cl.² .............................................. F04B 49/08
[52] U.S. Cl. ............................. 417/294; 123/139 AF; 123/139 AN; 123/140 FG; 137/56; 417/253
[58] Field of Search ................................ 417/253, 294; 123/139 AF, 139 AN, 140 A, 140 FG; 137/53, 56

[56] References Cited

U.S. PATENT DOCUMENTS

| 2,089,446 | 8/1937 | Stenger ............................. 417/294 X |
| 2,529,349 | 11/1950 | Nathan ................................. 417/294 |
| 3,289,590 | 12/1966 | Hutcheon ......................... 417/253 X |
| 3,645,285 | 2/1972 | Miyazaki ............................ 137/56 X |
| 3,676,023 | 7/1972 | Andrusenko et al. ............. 137/56 X |

FOREIGN PATENT DOCUMENTS 1228733  4/1971  United Kingdom ..................... 137/56

Primary Examiner—Carlton R. Croyle
Assistant Examiner—Edward Look

[57] ABSTRACT

A centrifugal pressure regulator comprises a pair of pistons slidable within a bore and moves in one direction by the action of a coiled spring and by centrifugal force imparted to the pistons as the body in which the bore is located rotates. The outer ends of the two pistons are subjected to the outlet pressure of a pump and the piston adjacent the spring is smaller in diameter than the other piston. The space between the pistons is vented to a drain and in the wall of the bore there is formed a spill port. The smaller of the pistons controls the size of the port which communicates with the outlet of the pump. The outlet pressure of the pump is controlled in accordance with the position of the pistons by spilling fuel through the port, the amount of fuel spilt depending on the effective size of the port.

5 Claims, 2 Drawing Figures

PRESSURE REGULATOR FOR A FLUID PUMP

This invention relates to a centrifugal pressure regulator for controlling the output pressure of a fluid pump, more particularly a fluid pump for supplying liquid fuel under pressure to an injection pump for an internal combustion engine.

The object of the invention is to provide a pressure regulator for the purpose specified in a simple and convenient form.

According to the invention, a centrifugal pressure regulator for the purpose specified comprises a body rotatable within a cavity, the speed of rotation of said body about its axis of rotation determining the output pressure of the pump with which the regulator is associated, a bore extending diametrically within the body, one end portion of said bore being of larger diameter than the other end portion, a first piston slidable in said one end portion of the bore, a second piston slidable in the other end portion of the bore, abutment means extending between the two pistons and defining therebetween and the wall of the bore a spill chamber, said pistons being subjected at their outer ends to the pressure in said cavity and having their combined mass, together with the mass of the abutment means offset relative to the axis of rotation of the body in the direction of the larger piston, a spill port in the wall of said bore, said spill port placing said cavity and spill chamber in communication with each other, the size of said spill port being controlled by said second piston, resilient means biasing said piston in the direction to reduce the size of said spill port, an outlet from said spill chamber, an inlet to said cavity and which in use is connected to the outlet of the pump and means for restricting the rate of movement of the pistons with variation of speed and/or output pressure.

Conveniently said resilient means comprises a coiled compression spring located within the bore and acting upon the outer end of the second piston.

Figure 2:
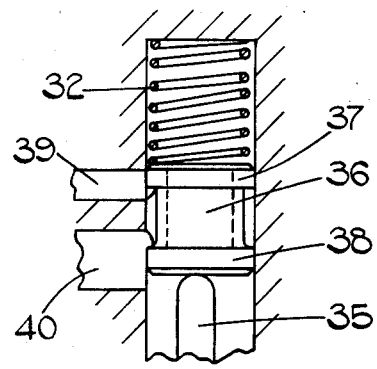

One example of a pressure regulator will now be described with reference to FIG. 1 of the accompanying drawing which also shows in outline a fuel pumping apparatus for supplying fuel under pressure to a compression ignition engine and FIG. 2 shows a modification to the pressure regulator.

With reference to FIG. 1 of the drawings, the engine to which fuel is supplied is indicated at 10 and the injection pump which supplies the fuel under pressure to the injectors of the engine in turn is indicated at 11. A plurality of outlets 12 are provided from the injection pump equal in number to the number of injectors. The injection pump is conveniently of the so-called rotary distributor type and has a component which is driven in timed relationship by the associated engine.

For supplying fuel to the injection pump 11 there is provided a feed pump 13, this having an outlet 14 and an inlet for liquid fuel indicated at 15. Conveniently, the rotary part of the feed pump is integrally formed with the rotary part of the injection pump. The feed pump is also what is termed a constant displacement pump and has a plurality of vanes which rotate within an eccentrically disposed chamber. Moreover, the rate of displacement of fuel by the feed pump 13 is at all times greater than the rate of fuel supplied to the engine.

The amount of fuel supplied by the injection pump to the engine is determined by a throttle 16 which is disposed intermediate the outlet 14 of the feed pump and an inlet indicated at 17, of the injection pump.

The throttle 16 is adjustable by the operator of the engine, so that the operator can determine the speed of the engine. Moreover, the throttle is associated with a governor mechanism the prime purpose of which is to ensure that the speed of the associated engine does not exceed a predetermined value. The governor mechanism may also be designed to effect other limits on the amount of fuel supplied to the engine to provide certain operating characteristics.

The governor means can be of the mechanical type which comprises a plurality of centrifugal weights which with increasing speed, move outwardly against the action of a spring. In so doing the effective size of the throttle is reduced so that a reduced quantity of fuel is supplied to the engine. The force exerted by the spring may be determined by the operator within the normal working range of the engine, so that the speed of the engine can be controlled. Alternatively, linkage coupling the weights to the throttle element may be adjustable by the operator again, so that he can effect control of the engine speed during the normal running range.

Alternatively, the governor mechanism can be responsive to the outlet pressure of the feed pump and this as will be described, is arranged to increase with increasing engine speed. In this case the governor essentially comprises a piston which is subjected to the outlet pressure of the feed pump. The piston controls the effective size of the throttle and as the speed increases, the size of the throttle is reduced. The force exerted on the piston is balanced against the force exerted by a spring this force being adjustable by the operator, so that variation in engine speed can be achieved within the normal speed range of the engine.

For efficient operation of the governor mechanism whether it be of the mechanical type or the hydraulic type, it is desirable for the output pressure of the feed pump 13 to be dependent upon the square of the speed at which the apparatus is driven and it is desirable that the pressure should vary in accordance with the expression $(n^2 + k)$.

For controlling the output pressure of the feed pump 13 there is provided a centrifugal regulator generally indicated at 18. The regulator comprises a body 19 which is rotatable within a cavity 21 defined in a housing 20. As will be seen, the body 19 is provided with an integral shaft 22 and in practice, the housing portion 20 can be secured to the main body of the pumping apparatus, which is formed by the injection pump and the feed pump. In this case the shaft 22 is coupled to the rotary element of the feed pump. Moreover, the cavity 21 communicates with the outlet 14 of the feed pump and formed on the shaft 22 is an annular groove 23 which communicates with the inlet 15 of the feed pump and with the source of fuel indicated at 24.

Extending diametrically within the body 19 is a bore 25. One end of the bore is of enlarged diameter and slidable within this portion of the bore is a first piston 26. Slidable within the narrower portion of the bore is a second piston 27. The piston 27 is formed with an abutment means 28 which is narrower than the bore and which has a rounded end engaging the piston 26. The abutment means 28 defines with the wall of the bore and the piston, a spill chamber 29.

The spill chamber 29 is in constant communication by way of a passage 30, with the groove 23. Moreover, formed in the wall of the body is a spill port 31. The port 31 places the spill chamber 29 in communication with the cavity and the size of the spill port is determined by the position of the second piston 27.

The pistons are urged in a direction to reduce the size of the spill port by means of resilient means in the form of a coiled compression spring 32. This engages the piston 27 and an abutment defined adjacent the end of the narrower portion of the bore. Moreover, the rate of flow of fuel into and out of the narrower end of the bore is determined by an orifice formed in an orifice plate 33. The orifice plate is conveniently held in position by the spring adjacent the abutment. Moreover, in order to prevent the piston 26 falling out of the wider end of the bore, an abutment is provided at that end of the bore. Furthermore, the combined mass of the two pistons, together with the abutment means 28 is offset relative to the axis of rotation of the body in the direction of the wider end of the bore.

In operation, the outer ends of the two pistons are subjected to the outlet pressure of the feed pump but since the piston 26 has the larger diameter, there will be a force developed acting to move the two pistons towards the orifice plate 33. This force is opposed by the action of the spring 32 and also by the centrifugal force acting on the pistons. Assuming for the moment a steady speed and a constant flow of fuel by way of the throttle 16, the pistons will assume an equilibrium position in which the forces expressed above are balanced. The port 31 will be partially opened so that fuel flows from the outlet 14 of the feed pump back to the inlet 15 of the feed pump by way of the port, the spill chamber 29, the passage 30 and the circumferential groove 23. If now the speed of the associated engine increases so that the body rotates at a higher speed, the centrifugal force will be increased and the effect of this will be for the two pistons to move away from the orifice plate 33 thereby reducing the effective size of the port 31. As a result, the output pressure of the feed pump will be increased. As it happens, since the feed pump is a constant displacement pump the volume of fuel pumped thereby will also increase and whilst the flow of fuel through the throttle will probably also increase, more fuel must be spilled between the outlet and the inlet of the pump. As a result, the movement of the pistons will in fact be less than in the single case described above.

The action of the orifice plate 33 is to control the rate of movement of the two pistons. If no orifice plate is present then the pistons will tend to oscillate whenever a change in the working conditions occurs such, for example, as a speed change or a sudden variation in the flow of fuel to the injection pump. By providing the orifice plate the pistons are in effect damped and therefore the oscillation can be reduced. If the pistons are critically damped then the equiliburium position is achieved in the shortest possible time without oscillation.

In a practical application it can be shown mathematically that there is a speed at which the output pressure of the feed pump will be a constant value irrespective of the viscosity of the fuel and it is suggested that this speed should be chosen so that it corresponds to the governed speed of the engine, particularly where an hydraulic governor as previously described, is employed. There is also an advantage for engine applications where sudden reduction in the loading of the engine can occur. Such an example is a marine engine where due to wave conditions, the propellor can move clear of the water. When this occurs the engine is suddenly unloaded and will accelerate very quickly. With the damping provided by the orifice plate the regulator will tend to allow the output pressure of the feed pump to rise very quickly and thereby the governing effect provided by the hydraulic governor, will come into operation earlier and thereby effect a governing action before the governed speed of the engine is attained. Ultimately, the engine would be controlled at its governed speed.

The output pressure of the feed pump obtained with the regulator described follows the law $(n^2+k)$ where n is the rotational speed and k the spring force. By using two pistons one of slightly larger diameter than the other, the output pressure of the feed pump can be controlled to a higher value than in the case where a single piston is employed. This is because there is a lower force due to fuel pressure acting on the pistons in opposition to the centrifugal force.

The shape of the spill port 31 is important and it has an effect upon the characteristics of the regulator and also its sensitivity to the viscosity of the fuel.

In the modification shown in FIG. 2 the abutment means 35 extending between the two pistons is mounted on the larger piston. The smaller piston 36 is of cup shaped form having its base portion directed towards the larger piston. The pistons are spring loaded by the spring 32 which bears against the end wall of the bore, the bore at this end being closed. The piston 36 is provided with an annular groove which defines a pair of spaced lands 37, 38. The land 37 being the one remote from the larger piston is slightly smaller than the bore thereby creating the equivalent of a dashpot with the closed end of the bore.

Opening into the bore are a pair of spaced ports 39, 40. Both ports communicate with the cavity which communicates with the outlet of the feed pump, and a spill passage equivalent to the passage 30, communicates with the annular space between the pistons. The annular groove is in constant communication with the port 39 or the port 40 and the size of the port 40 which is exposed to the space between the pistons is determined by the position of the piston 36, to determine the quantity of fuel spilled between the inlet and outlet of the feed pump. The operation of the valve is as described above.

The piston 36 is made hollow so that its mass is as small as possible and its centre of mass as close as possible to the axis of rotation of the shaft preferably on the same side as the larger piston. In this manner both pistons will move in the same direction under the action of centrifugal force.

In both examples the damping may be applied to the larger piston.

I claim:

1. A centrifugal pressure regulator for controlling the output pressure of a fluid pump associated with said regulator, comprising: a body rotatable within a cavity, the speed of rotation of said body about its axis of rotation determining the output pressure of the pump, a bore extending diametrically within the body, one end portion of said bore being of larger diameter than the other end portion, a first piston slidable in said one end portion of the bore, a second piston slidable in the other end portion of the bore, abutment means extending between the two pistons and defining therebetween and the wall of the bore a spill chamber, said pistons being subjected at their outer ends to the pressure in said cavity and having their combined mass, together with the mass of the abutment means offset relative to the axis of rotation of the body in the direction of the larger piston, a spill port in the wall of said bore, said spill port placing said cavity and spill chamber in communication with each other, the size of said spill port being controlled by said second piston, resilient means biasing said piston in the direction to reduce the size of said spill port, an outlet communicating with said spill chamber for fuel which has flowed through said spill port, an inlet to said cavity and which in use is connected to the outlet of the pump, and means for restricting the rate of movement of the pistons with variation of speed and/or output pressure.

2. A regulator according to claim 1 in which said resilient means comprises a coiled compression spring located within the bore and acting upon the outer end of the second piston.

3. A regulator according to claim 2 including an abutment at the narrower end of the bore, said abutment being engaged by an orifice plate held in engagement with said abutment by said coiled compression spring, said orifice plate acting to restrict the rate of flow of liquid into and out of the narrower end of said bore to restrict the rate of movement of the pistons.

4. A regulator according to claim 2 in which the other end of said spring leans against a closed end wall of said bore, said second piston having an annular groove formed thereon to define a pair of spaced lands, the land adjacent the closed end of the bore defining with the wall of the bore, restricted passage means to restrict the rate of the fuel flow into the closed end of the bore.

5. A regulator according to claim 4 in which said second piston is of cup shaped form.

* * * * *